(12) United States Patent
Okamoto et al.

(10) Patent No.: US 6,504,061 B1
(45) Date of Patent: Jan. 7, 2003

(54) ALKOXYLATION CATALYST AND METHOD FOR PRODUCING THE SAME, AND METHOD FOR PRODUCING ALKYLENE OXIDE ADDUCT USING THE CATALYST

(75) Inventors: Takahiro Okamoto, Saitama (JP); Shingo Uemura, Tokyo (JP); Itsuo Hama, Chiba (JP)

(73) Assignee: Lion Corporation, Tokyo (JP)

( * ) Notice: Subject to any disclaimer, the term of this patent is extended or adjusted under 35 U.S.C. 154(b) by 253 days.

(21) Appl. No.: 09/715,331

(22) Filed: Nov. 17, 2000

Related U.S. Application Data

(60) Division of application No. 09/441,006, filed on Nov. 16, 1999, now abandoned, which is a continuation-in-part of application No. 09/211,551, filed on Dec. 15, 1998, now abandoned.

(30) Foreign Application Priority Data

Jun. 10, 1998 (JP) .......................................... 10-161718
Jun. 10, 1999 (JP) .......................................... 11-163353

(51) Int. Cl.⁷ .............................................. C07C 41/03
(52) U.S. Cl. ....................................... 568/618; 568/619
(58) Field of Search ................................. 568/618, 619

(56) References Cited

U.S. PATENT DOCUMENTS

| | | | |
|---|---|---|---|
| 4,067,924 A | 1/1978 | Manning | 260/683.3 |
| 5,012,012 A | 4/1991 | Nakamura | 568/618 |
| 5,146,020 A | 9/1992 | Rudershausen | 570/163 |
| 5,371,306 A | 12/1994 | Woo et al. | 568/804 |
| 5,374,750 A | 12/1994 | Nakamura et al. | 554/149 |
| 5,686,379 A | 11/1997 | Imanaka et al. | 502/340 |
| 5,750,796 A | 5/1998 | Hama et al. | 568/618 |
| 5,830,822 A | 11/1998 | Euzen | 502/355 |

FOREIGN PATENT DOCUMENTS

| | | |
|---|---|---|
| EP | 0 339 436 | 4/1989 |
| EP | 0 826 715 | 8/1996 |
| GB | 2 053 713 A | 2/1981 |
| JP | 8-169860 | 7/1996 |
| JP | 8-169861 | 7/1996 |
| JP | 8-323200 | 12/1996 |
| JP | 11-114417 | 4/1999 |
| WO | WO 90/13533 | 11/1990 |

OTHER PUBLICATIONS

Jinan Wang et al., "A study of surface and inner layer composition of Mg–Fe–Al–O mixed spinel sulfur–transfer catalyst using Auger electron spectroscopy", Sep. 1997, pp. 223–227, *Materials Letters* 32, 1997.

*Primary Examiner*—Ba K. Trinh
(74) *Attorney, Agent, or Firm*—Merchant & Gould P.C.

(57) ABSTRACT

The present invention provides an alkoxylation solid catalyst with which an alkylene oxide adduct having a narrow adduct distribution can be produced while inhibiting formation of high molecular weight polyalkylene glycol having a molecular weight of about tens of thousands as a by-product. The alkoxylation catalyst comprises a metal oxide containing magnesium, aluminum, and at least one metal selected from the metals that belong to group VIA, group VIIA, and group VIII as a third component. The third component metal changes the structure of the active site in the catalyst, for example, by forming a metal oxide having a spinel-type structure with aluminum (e.g. when the third component metal is Mn, $MnAl_2O_4$ is formed), so that a side reaction of forming a high molecular weight polyalkylene glycol is inhibited.

9 Claims, 14 Drawing Sheets

Reaction Example 3

Reaction Example 4

Reaction Example 5

Reaction Example 6

Comparative Reaction Example 1

Comparative Reaction Example 2

Comparative Reaction Example 3

Reaction Example 11

Comparative Reaction Example 4

ALKOXYLATION CATALYST AND METHOD FOR PRODUCING THE SAME, AND METHOD FOR PRODUCING ALKYLENE OXIDE ADDUCT USING THE CATALYST

This application is a divisional of application Ser. No. 09/441,006, filed Nov. 16, 1999, now abandoned which is a CIP of application Ser. No. 09/211,551, filed Dec. 15, 1998 now abandoned which application(s) are incorporated herein by reference.

FIELD OF THE INVENTION

The present invention relates to an alkoxylation catalyst and a method for producing the same, and a method for producing an alkylene oxide adduct using the catalyst. More particularly, the invention relates to an alkoxylation solid catalyst comprising a metal oxide, and to a method for producing an alkylene oxide adduct that is useful as a chemical material for a surfactant or the like.

BACKGROUND OF THE INVENTION

A compound in which an alkylene oxide is added to an organic compound having an active hydrogen or to an ester is widely used as a chemical material for surfactants, solvents, or the like. Particularly, those obtained by polyalkoxylating alcohol, fatty acid, fatty acid ester, amine, alkylphenol, or the like with an alkylene oxide such as ethylene oxide or propylene oxide have been utilized as nonionic surfactants in a wide range of application.

As such an alkylene oxide adduct, one having a narrow adduct distribution has many advantages, e.g. high foamability, as compared with one having a wide adduct distribution. As a method for obtaining an alkylene oxide adduct having a narrow adduct distribution, those using a halide catalyst such as a halide of boron, tin, antimony, iron, or aluminum, or an acid catalyst such as phosphoric acid or sulfuric acid are well known. However, in such a method using an acid catalyst, sufficiently narrow adduct distribution cannot be obtained, and a large amount of by-product such as dioxane, dioxolane, or polyethylene glycol is produced. In addition, such an acid catalyst strongly corrodes materials of equipment.

Accordingly, as a solid catalyst for producing an alkylene oxide adduct having a narrow adduct distribution, the following composite oxides have been proposed.

1) Japanese Published Unexamined Patent Application No. (Ibkkai hei) 1-164437: A method for producing an alkylene oxide adduct having a narrow adduct distribution uses as a catalyst a magnesium oxide in which a metal ion such as aluminum is added. It discloses, for example, a magnesium oxide catalyst containing 3 wt. % of aluminum.

2) Japanese Published Unexamined Patent Application No. (Ibkkai hei) 2-71841: A method for producing an alkylene oxide adduct having a narrow adduct distribution with a calcined hydrotalcite as a catalyst is disclosed. The calcined hydrotalcite can be obtained by cacining a natural or synthetic hydrotalcite.

3) Japanese Published Unexamined Patent Application No. (Ibkkai hei) 7-227540: A method for producing an alkylene oxide adduct with a magnesium oxide containing zinc, antimony, tin, or the like as a catalyst, in which generation of a by-product (polyethylene glycol) is inhibited, is disclosed. By using the Mg—Zn, Mg—Sb or Mg—Sn composite oxide catalyst, the amount of polyethylene glycol formed as a by-product can be reduced, although the catalytic activity may be decreased as compared with a case using a magnesium oxide catalyst in which aluminum is added. However, the effect of inhibiting polyethylene glycol formation is still insufficient.

4) Japanese Published Unexamined Patent Application No. (Tokkai hei) 8-268919: A method for producing an alkylene oxide adduct having a narrow adduct distribution uses as a catalyst an Al—Mg composite oxide which is obtained by cacining aluminum magnesium hydroxide.

An alkylene oxide adduct obtained using each of the above-mentioned catalysts has a narrower adduct distribution than that obtained with an acid catalyst. Moreover, generation of a by-product such as dioxane can be inhibited. Particularly, a composite oxide of magnesium and aluminum has a high activity. However, the composite oxide catalyst cannot inhibit formation of polyalkylene glycol as a by-product. Japanese Published Unexamined Patent Application No. Tokkai hei) 7-227540 discloses a catalyst capable of reducing the amount of polyalkylene glycol formed as a by-product. However, the effect of inhibiting polyethylene glycol formation is still insufficient. Moreover, it is a high molecular weight polyalkylene glycol with a molecular weight of several tens of thousands that causes particularly difficult problems. Even a trace of high molecular weight polyalkylene glycol can cause problems in polyalkoxylating. For example, removing catalysts may become difficult, and the stability of a product containing the alkylene oxide adduct may be reduced. Moreover, a catalyst for producing an alkylene oxide adduct is required to have a sufficient catalytic activity in practical use.

SUMMARY OF THE INVENTION

Accordingly, it is an object of the present invention to provide a catalyst with which an alkylene oxide adduct having a narrow adduct distribution can be produced more advantageously from an industrial standpoint and a method for producing the same, and a method for producing an alkylene oxide adduct using the catalyst. Particularly, it is an object of the present invention to provide a catalyst with which an alkylene oxide adduct having a narrow adduct distribution can be produced efficiently while inhibiting formation of high molecular weight polyalkylene glycol.

As a result of earnest research with respect to an alkoxylation catalyst suitable for production of an alkylene oxide adduct having a narrow adduct distribution, the inventors have found that it is possible to achieve both high catalytic activity and inhibition of high molecular weight polyalkylene glycol formation with a catalyst prepared by adding a particular metal to a Mg—Al composite oxide.

Thus, a first alkoxylation catalyst of the present invention comprises a metal oxide containing magnesium, aluminum, and at least one metal selected from the metals that belong to group VIA, group VIIA, and group VIII.

The above-mentioned metal added to the Mg—Al composite oxide is selected from those elements that belong to group VIA (chromium, molybdenum, and tungsten), group VIIA (manganese, technetium, and rhenium), and group VIII (iron, cobalt, nickel, ruthenium, rhodium, palladium, osmium, iridium, and platinum) in the periodic table according to a subgroup system.

The alkoxylation catalyst of the present invention is obtained by adding the metal as a third component to Mg—Al composite oxide containing simultaneously a basic site of an oxygen atom adjacent to a magnesium atom for activating an organic compound having an active hydrogen, and an acidic site of an aluminum atom for activating an alkylene oxide. Mg—Al composite oxide has been conventionally utilized, and it is a highly active catalyst with which an alkylene oxide adduct having a narrow adduct distribution can be produced. Moreover, according to the present invention, formation of high molecular weight polyalkylene oxide glycol as a by-product can be inhibited by the third component. This is because the addition of the metal as a third component causes a structural change in the active site of the side reaction. The structure of the active site in the catalyst is changed, for example, by forming a spinel-type structure that includes the third component metal and aluminum.

A second alkoxylation catalyst of the present invention comprises a metal oxide containing magnesium, aluminum, and M (M is at least one selected from the metal elements other than magnesium and aluminum). The metal oxide includes a spinel-type structure that contains aluminum and M.

The metal oxide having the spinel-type structure is represented, for example, by a chemical formula $MAl_2O_4$. The metals belonging to groups VIA, VIIA, or VIII can be employed as M, but it is not particularly limited. Two or more types of elements also may be used as M.

The presence of the above-mentioned spinel-type structure can be confirmed by X-ray diffraction analysis. It is preferable that the catalyst includes an oxide in which an X-ray diffraction peak resulting from a rock-salt structure of a magnesium oxide is observed as well as an X-ray diffraction peak resulting from a spinel structure.

Thus, by using at least one of the catalysts of the present invention, it is possible to produce an alkylene oxide adduct having a narrow adduct distribution efficiently, while inhibiting formation of high molecular weight polyalkylene glycol as a by-product. Furthermore, the method for producing an alkylene oxide adduct according to the present invention comprises adding an alkylene oxide to an organic compound in the presence of the alkoxylation catalyst of the present invention.

Furthermore, the method for producing an alkoxylation catalyst comprising a metal oxide according to the present invention comprises: forming a precipitate containing elements of magnesium, aluminum, and at least one element selected from the metal elements belonging to groups VIA, VIIA, and VIII from a mixed aqueous solution containing the elements; and burning the precipitate at a temperature of 300 to 1000° C. so as to obtain the metal oxide.

DETAILED DESCRIPTION OF THE INVENTION

Figure 1:
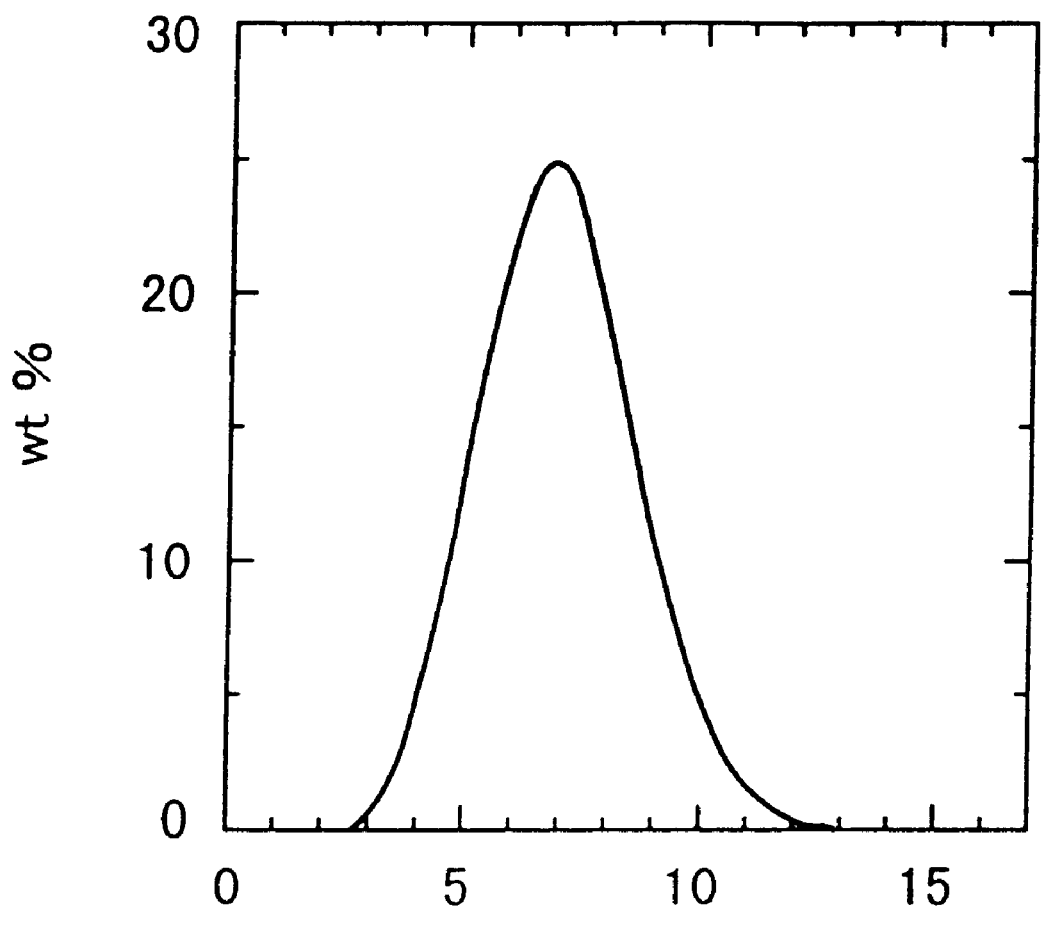
FIG. 1 is a graph showing the adduct distribution of an EO adduct obtained according to Reaction Example 1 using a catalyst of the present invention.
Figure 2:
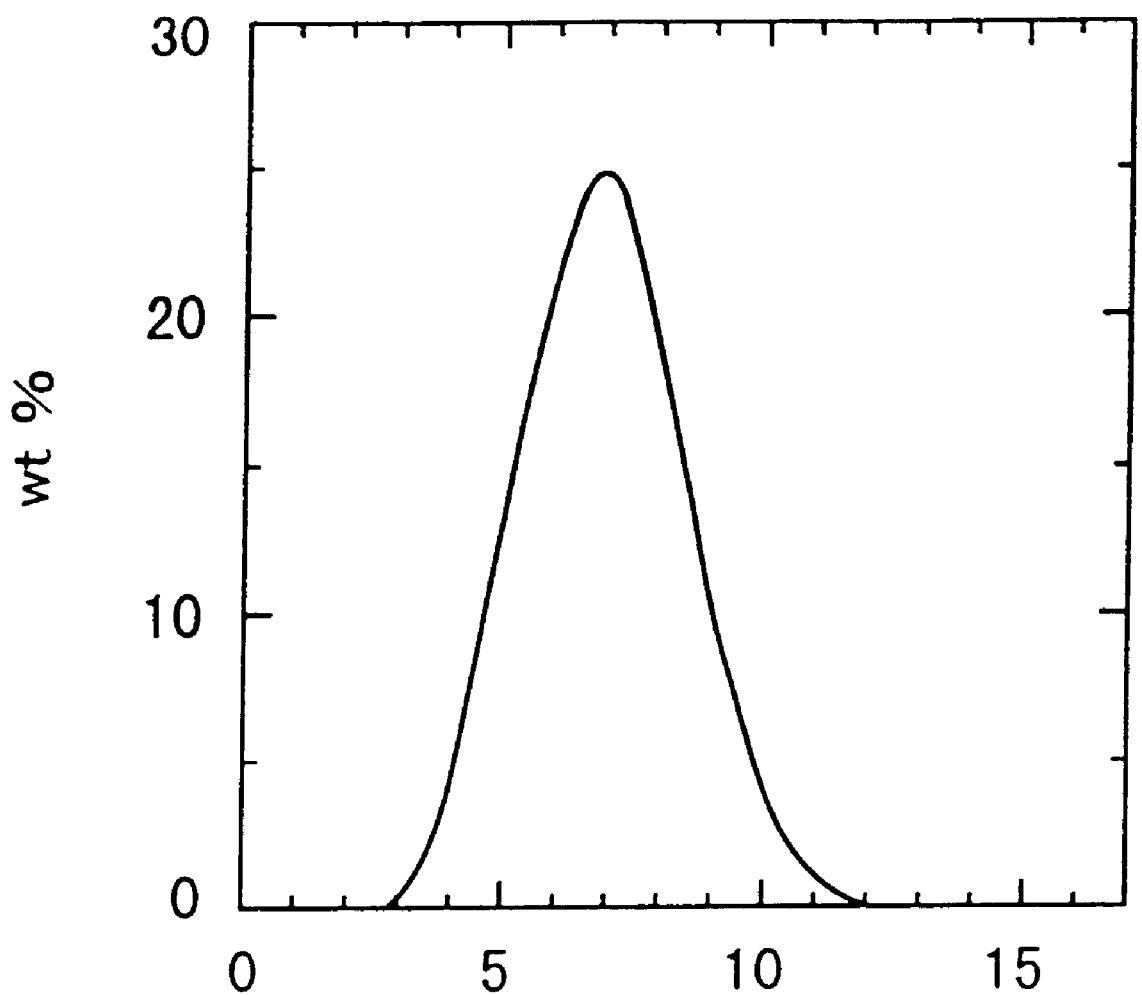
FIG. 2 is a graph showing the adduct distribution of an EO adduct obtained according to Reaction Example 2 using a catalyst of the present invention.
Figure 3:
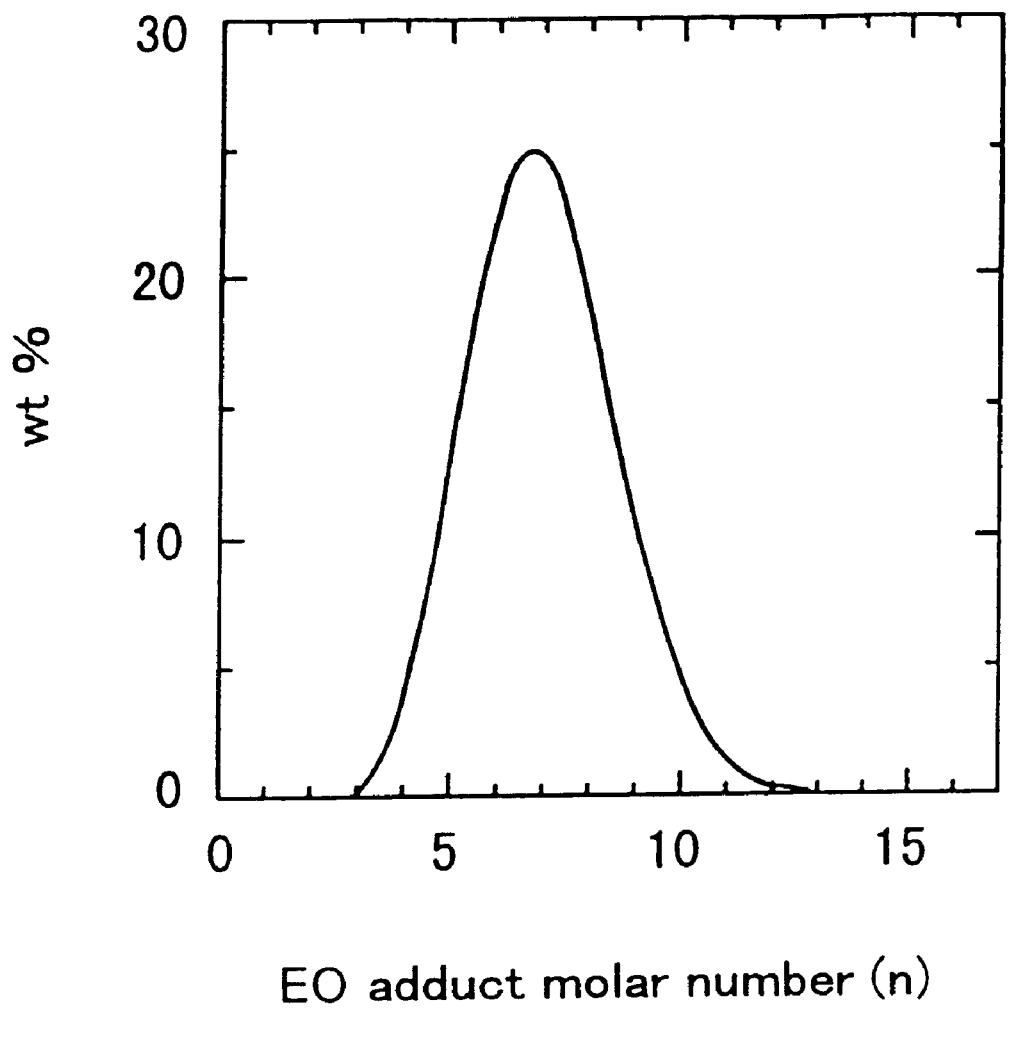
FIG. 3 is a graph showing the adduct distribution of an EO adduct obtained according to Reaction Example 3 using a catalyst of the present invention.
Figure 4:
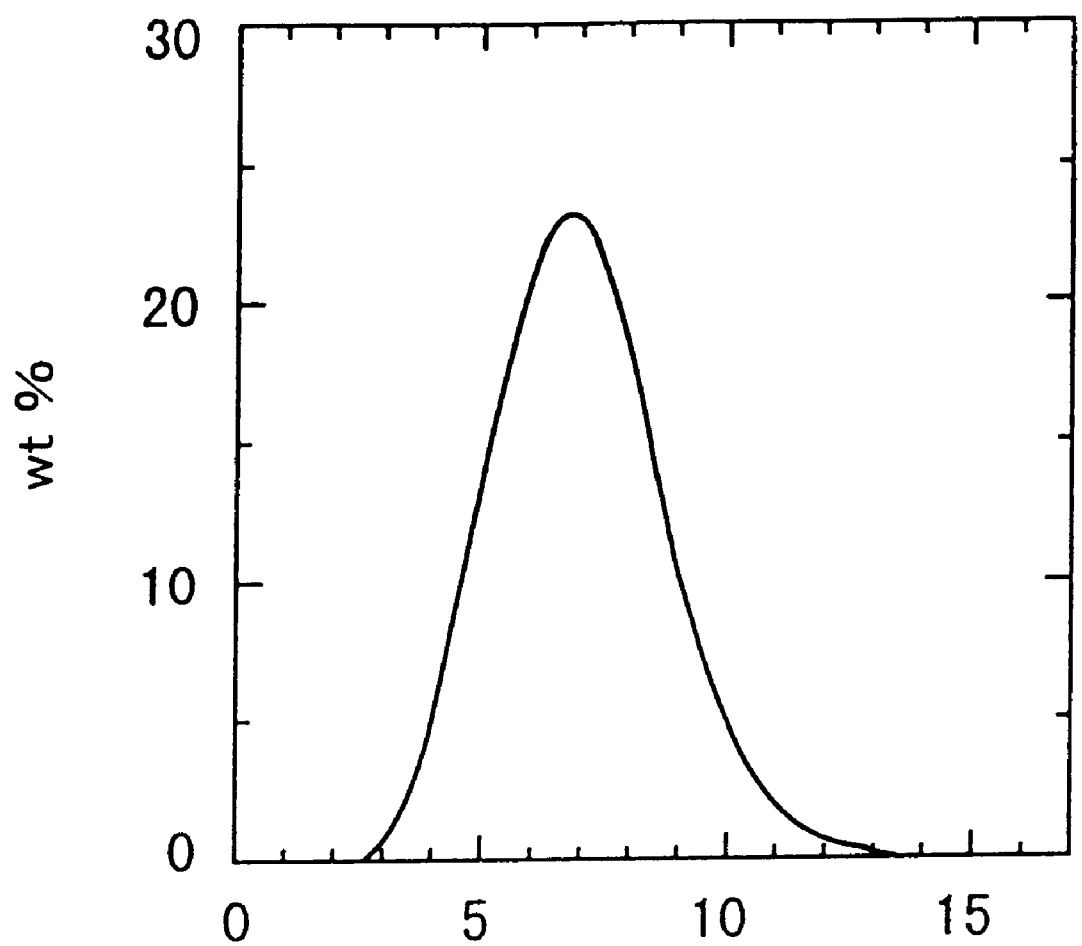
FIG. 4 is a graph showing the adduct distribution of an EO adduct obtained according to Reaction Example 4 using a catalyst of the present invention.
Figure 5:
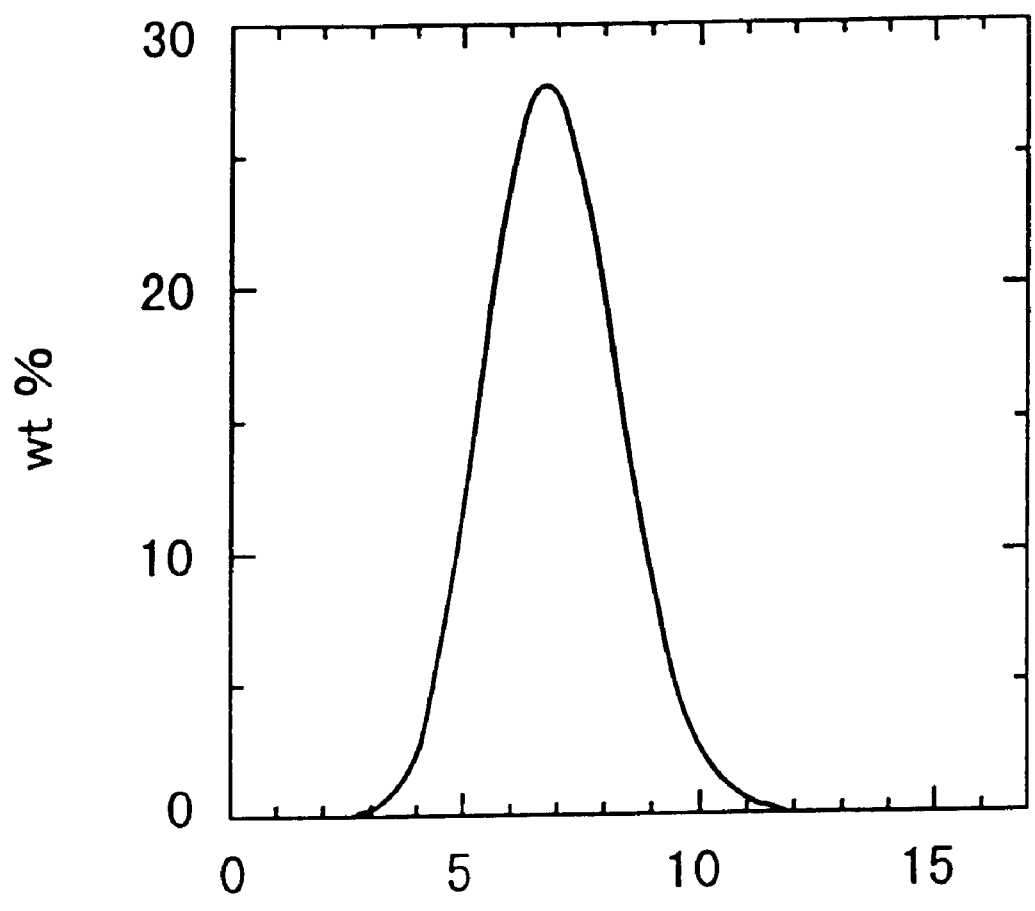
FIG. 5 is a graph showing the adduct distribution of an EO adduct obtained according to Reaction Example 5 using a catalyst of the present invention.
Figure 6:
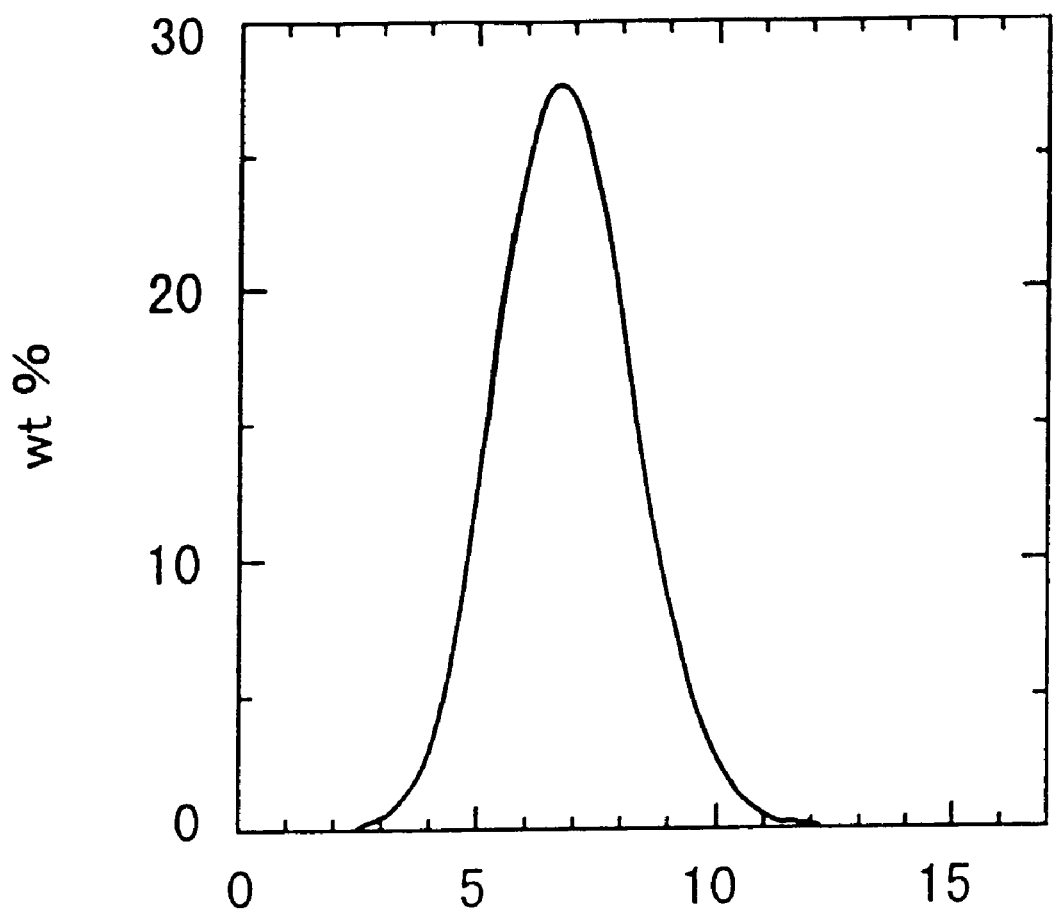
FIG. 6 is a graph showing the adduct distribution of an EO adduct obtained according to Reaction Example 6 using a catalyst of the present invention.
Figure 7:
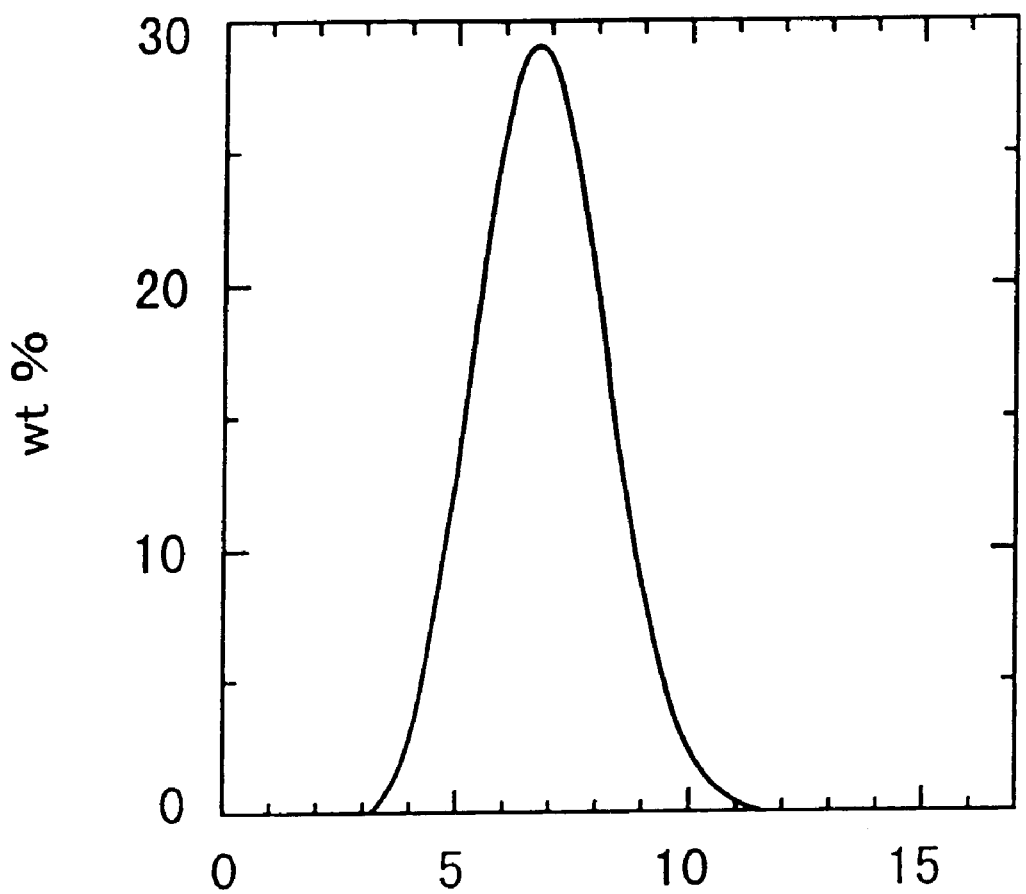
FIG. 7 is a graph showing the adduct distribution of an EO adduct obtained according to Comparative Reaction Example 1.
Figure 8:
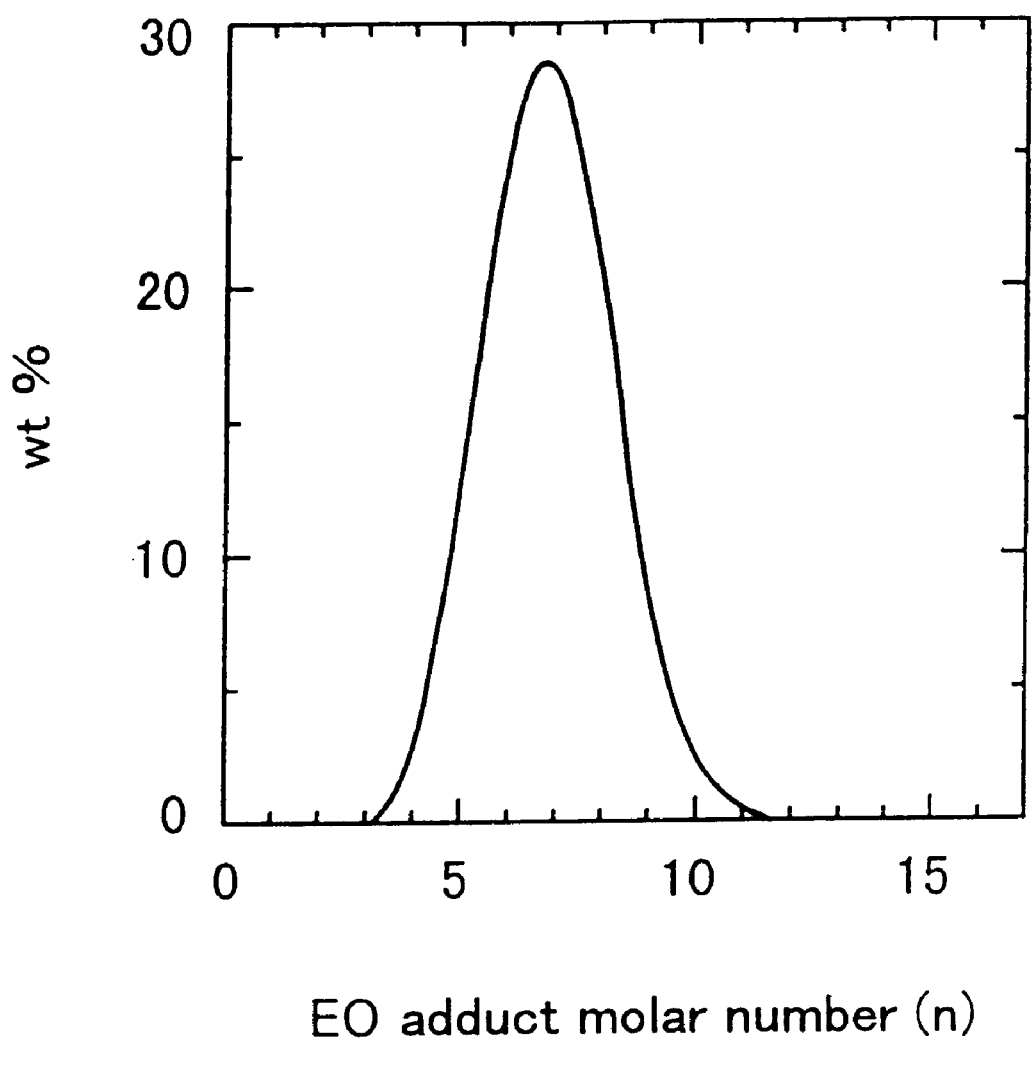
FIG. 8 is a graph showing the adduct distribution of an EO adduct obtained according to Comparative Reaction Example 2.
Figure 9:
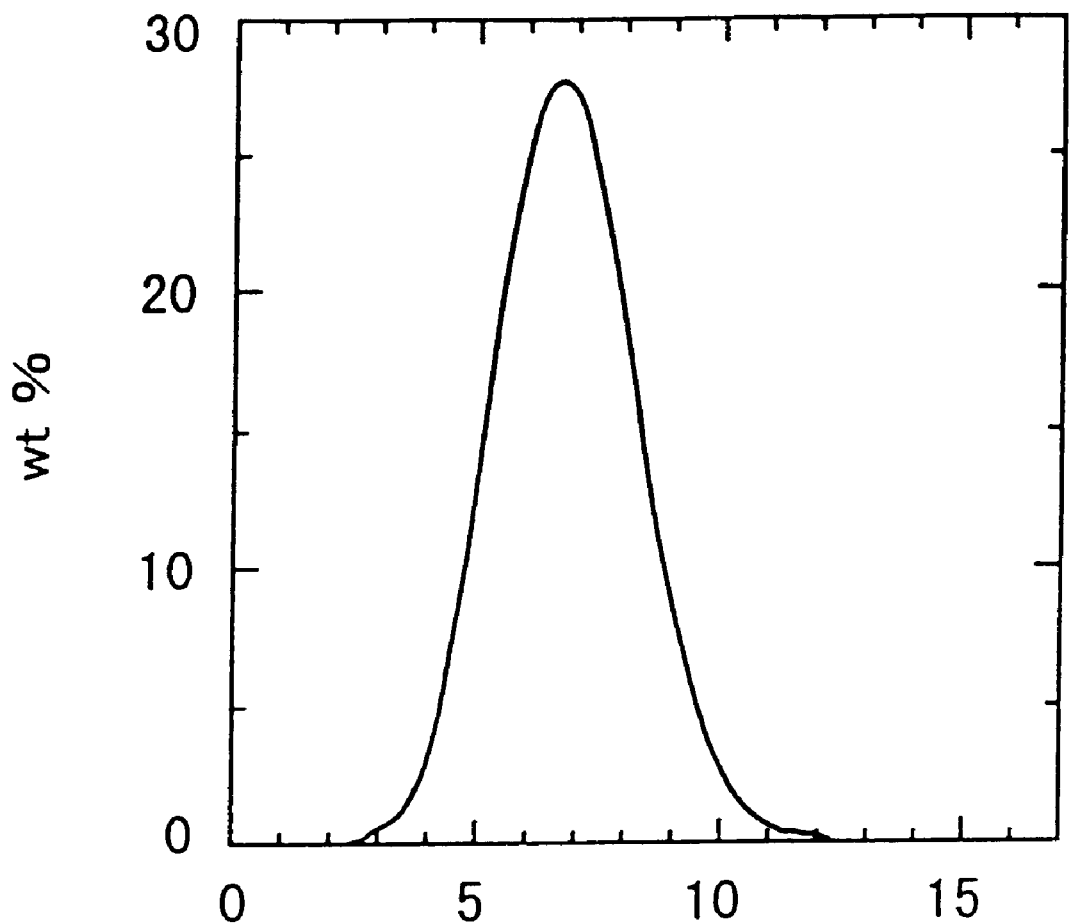
FIG. 9 is a graph showing the adduct distribution of an EO adduct obtained according to Comparative Reaction Example 3.
Figure 10:
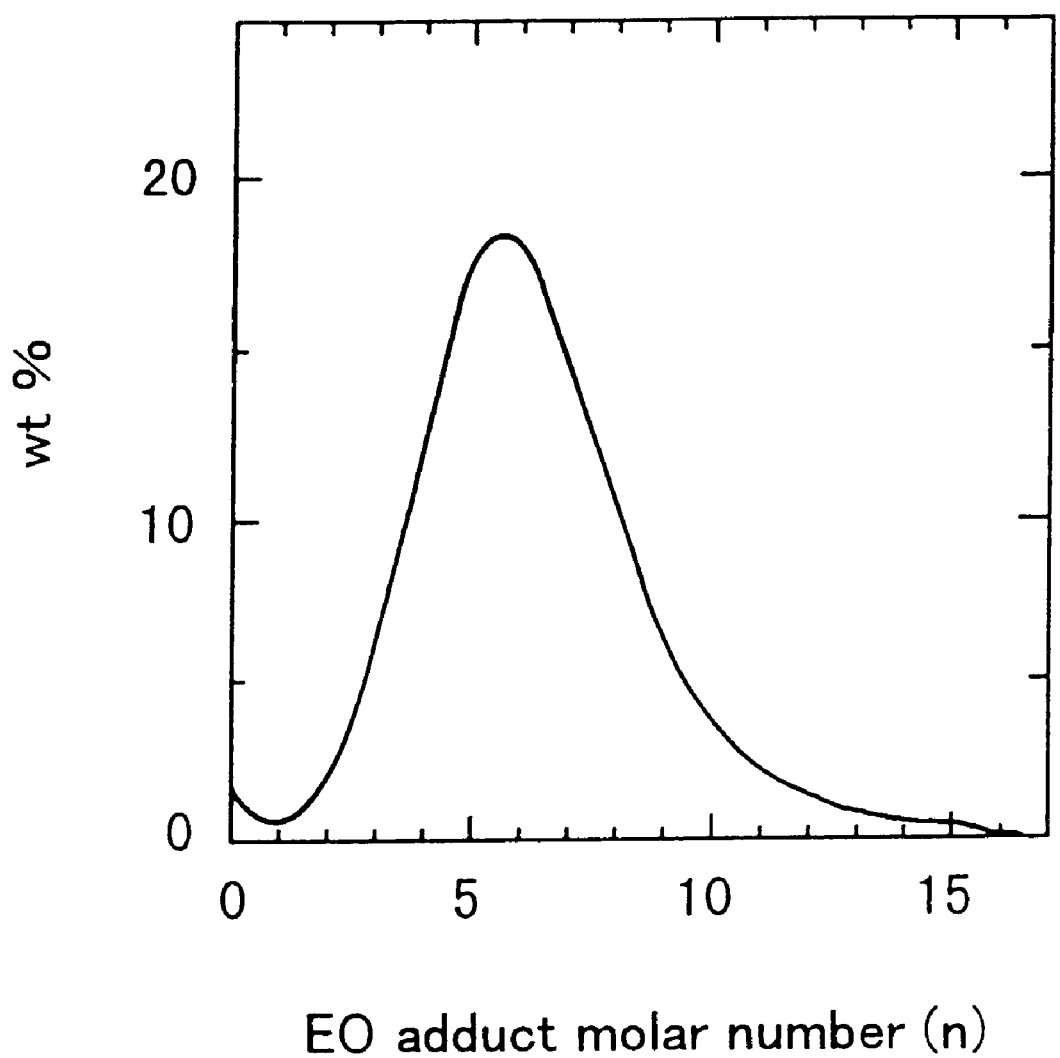
FIG. 10 is a graph showing the adduct distribution of an EO adduct obtained according to Reaction Example 11 using a catalyst of the present invention.
Figure 11:
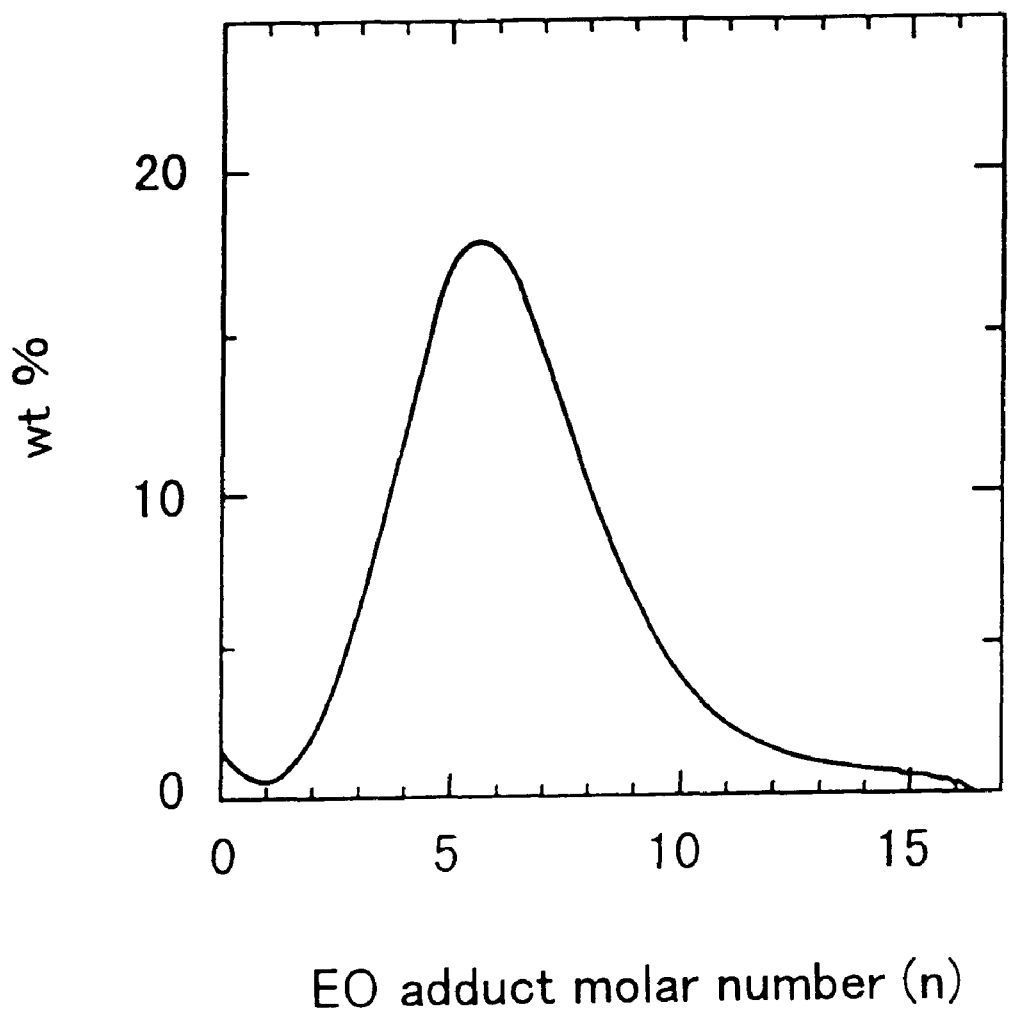
FIG. 11 is a graph showing the adduct distribution of an EO adduct obtained according to Comparative Reaction Example 4.

The catalyst of the present invention will be described in detail as follows.

As the metal of the third component in the catalyst of the present invention, chromium, molybdenum, manganese, technetium, iron, cobalt, nickel, or ruthenium is preferably used. More preferably, chromium, manganese or iron is used, and particularly preferably manganese is used. A combination of at least two of the above-mentioned metals may be also used as the third component.

In the catalyst of the present invention, it is preferable that the ratio of each metal is within a range suitable for inhibiting formation of high molecular weight polyalkylene glycol as a by-product, while maintaining high catalytic activity of Mg—Al composite oxide. A preferable ratio of each metal is described below.

The atomic ratio between magnesium and aluminum as shown by Al/(Mg+Al) is preferably in the range of 0.1 to 0.7, more preferably 0.3 to 0.6.

The atomic ratio of the metal added as a third component with respect to the total metals is preferably in the range of 0.05 to 0.4, more preferably 0.1 to 0.25. If the amount of the third component is too small, the effect of inhibiting formation of high molecular weight polyalkylene glycol cannot be obtained sufficiently. On the other hand, if the amount of the third component is excessively large, the catalytic activity may be decreased.

The catalyst of the present invention can be obtained by a known method for preparing a multi-element composite oxide, for example, by the impregnation method or coprecipitation method. A process of preparing the catalyst of the present invention by the coprecipitation method is herein described.

According to the coprecipitation method, first a mixed aqueous solution containing a metal compound such as nitrate, sulfate, carbonate, acetate, or chloride of each metal is prepared, and a precipitant is added to the aqueous solution. The precipitate obtained by the addition of the precipitant is treated by washing with water, drying, calcining, or the like so as to form a catalyst comprising a composite oxide.

A particular example applying the coprecipitation method to the present invention is a method of forming a precipitate by dropping a mixed aqueous solution containing metal compounds of magnesium, aluminum and a metal as a third component with a precipitant, while adjusting the flow so that the pH of the mixture solution falls in a predetermined range. In this example, it is preferable that the pH of the mixture solution is adjusted within the range of 7 to 11, particularly 8 to 10. If the coprecipitation is carried out at a pH not within the above-mentioned range, metals may be eluted. Thus, an oxide catalyst having desired composition and crystal structure may not be obtained. Preferable examples of the precipitant are alkaline aqueous solutions, particularly alkaline aqueous solutions containing a carbonate such as sodium carbonate. Furthermore, in order to maintain the pH within the above-mentioned range, it is preferable that the precipitant contains a hydroxide of alkali metal such as sodium hydroxide.

From the composite hydroxide obtained as a precipitate, water soluble salts are removed by washing with water, and then it is dried. Thereafter, it is calcined by heating at 300 to 1000° C., preferably at 600 to 900° C., more preferably at 700 to 900° C. Thus, a catalyst of the present invention comprising a composite oxide can be obtained. The heating temperature has an influence on the change of the structure of the active site in the catalyst. When the heating temperature is too low, the third component and aluminum may not form a spinel structure, so that the active site in the catalyst may not be changed adequately. On the other hand, when the heating temperature is too high, sintering is facilitated and surface area is decreased, so that catalytic activity may be decreased.

Next, an organic compound to which alkylene oxide is added using a catalyst of the present invention will be described. Such an organic compound is not particularly limited, as long as it can be alkoxylated, but particularly used is an organic compound having an active hydrogen or an ester. More particularly, alcohols, phenols, fatty acids, fatty acid esters, fatty amines, fatty acid amides, polyols, or a mixture thereof are suitably used. Typical examples of them are illustrated in the following.

As alcohols, it is preferable to use a saturated or unsaturated primary or secondary alcohol having 2 to 30 carbon atoms, more preferably a primary alcohol having 4 to 24 carbon atoms, particularly preferably a primary alcohol having 6 to 24 carbon atoms. Furthermore, as phenols, it is preferable to use mono-, di-, or trialkylphenol, particularly a compound having 4 to 12 carbon atoms in an alkyl group.

As fatty acids, a fatty acid having 8 to 22 carbon atoms, for example, a saturated or unsaturated straight-chain fatty acid obtainable by fat decomposition of coconut oil, palm oil, palm kernel oil, soybean oil, sunflower oil, rapeseed oil, fish fat, or the like (e.g. caprylic acid, n-capric acid, lauric acid, myristic acid, oleic acid, or stearic acid), or a mixture thereof preferably can be used. Furthermore, as fatty acid esters, it is preferable to use those produced by esterifying the above-mentioned fatty acids with an alcohol of alkyl group having 1 to 4 carbon atoms (an alkanol having 1 to 4 carbon atoms).

As fatty amines, it is preferable to use a primary fatty amine obtainable from a saturated or unsaturated straight-chain fatty acid or a compound in which nitrile is introduced into corresponding aliphatic alcohol. Furthermore, as the fatty acid amides, it is preferable to use a derivative obtainable by reaction between a saturated or unsaturated straight-chain fatty acid and ammonia or primary fatty amine.

As the polyols, it is preferable to use polyethylene glycol or polypropylene glycol having an average degree of polymerization of 2 to 2,000, or glycerol, sorbitol, or the like.

On the other hand, in the present invention, it is preferable to use an alkylene oxide having 2 to 8 carbon atoms, particularly preferably ethylene oxide, propylene oxide, or butylene oxide having 2 to 4 carbon atoms.

In the following, preferable conditions of reaction in the method for producing an alkylene oxide adduct according to the present invention will be described. The reaction temperature is preferably 80 to 230° C., more preferably 120 to 200° C., most preferably 160 to 180° C. Although the reaction pressure also depends on the reaction temperature, it is preferably 0 to 20 atm, more preferably 2 to 8 atm. Although it also depends on the molar ratio of the alkylene oxide and the starting material provided in the reaction, usually the amount of the catalyst used is preferably 0.01 to 20 wt. %, more preferably 0.05 to 5 wt. %, of the starting material such as alcohol.

The reaction operation is as follows. For example, starting material such as alcohol and a catalyst are put in an autoclave. After the substitution of nitrogen gas for the air in the autoclave, an alkylene oxide is introduced into the autoclave to cause reaction under predetermined temperature and pressure conditions. The catalyst may be present in the reaction product depending on its use, however, it is usually separated from the reaction product by filtering, which is performed after adding water or a filter aid to decrease viscosity.

According to the present invention, in a method for producing an alkylene oxide adduct using the catalyst of the present invention, an alkylene oxide adduct having a very narrow adduct distribution can be produced more efficiently with high catalytic activity, with a very small amount of high molecular weight polyethylene glycol formed as a by-product. Particularly, because formation of high molecular weight polyalkylene glycol as a by-product is inhibited, the efficiency of filtering catalyst can be improved, and also the properties (e.g. stability in low temperature) of a chemical product using the obtained alkylene oxide adduct as a material are improved.

The present invention will be described below in more detail by way of examples and comparative examples. These examples are illustrative in nature and should not be considered as limiting the present invention.

EXAMPLE 1

To prepare a solution A, 68.03 g (0.265 mol) of magnesium nitrate hexahydrate, 47.69 g (0.127 mol) of aluminum nitrate nonahydrate, and 24.33 g (0.085 mol) of manganese nitrate hexahydrate were dissolved in 450 g of deionized water. On the other hand, 13.47 g (0.127 mol) of sodium carbonate was dissolved in 450 g of deionized water to prepare a solution B.

The solutions A and B were dropped into a catalyst preparation vessel previously supplied with 1,800 g of deionized water over a period of 1 hour, while maintaining the pH of 9 with 2N-NaOH and the temperature of 40° C. After completing the dropping, the mixed solution was aged for 1 hour. The mother liquor was removed by filtration, and the precipitate was washed with 6 liters of deionized water and spray-dried, and 30 g of a composite hydroxide was obtained. The composite hydroxide was calcined for 3 hours at 800° C. in a nitrogen atmosphere to obtain 19 g of a Mg—Al—Mn composite oxide catalyst (Mg:Al:Mn (by atomic ratio)=0.56:0.26:0.18).

EXAMPLE 2

To prepare a solution A, 68.03 g (0.265 mol) of magnesium nitrate hexahydrate, 47.69 g (0.127 mol) of aluminum nitrate nonahydrate, and 20.83 g (0.085 mol) of manganese acetate tetrahydrate were dissolved in 450 g of deionized water. On the other hand, 13.47 g (0.127 mol) of sodium carbonate was dissolved in 450 g of deionized water to prepare a solution B.

After that, according to the same procedure as in Example 1, 19 g of a Mg—Al—Mn composite oxide catalyst (Mg:Al:Mn (by atomic ratio)=0.56:0.26:0.18) was obtained.

EXAMPLE 3

To prepare a solution A, 69.68 g (0.272 mol) of magnesium nitrate hexahydrate, 61.06 g (0.163 mol) of aluminum nitrate nonahydrate, and 14.60 g (0.051 mol) of manganese nitrate hexahydrate were dissolved in 450 g of deionized water. On the other hand, 17.26 g (0.163 mol) of sodium carbonate was dissolved in 450 g of deionized water to prepare a solution B.

After that, according to the same procedure as in Example 1, 21 g of a Mg—Al—Mn composite oxide catalyst (Mg:Al:Mn (by atomic ratio)=0.56:0.34:0.10) was obtained.

EXAMPLE 4

To prepare a solution A, 66.72 g (0.260 mol) of magnesium nitrate hexahydrate, 38.98 g (0.104 mol) of aluminum nitrate nonahydrate, and 29.82 g (0.104 mol) of manganese nitrate hexahydrate were dissolved in 450 g of deionized water. On the other hand, 11.01 g (0.104 mol) of sodium carbonate was dissolved in 450 g of deionized water to prepare a solution B.

After that, according to the same procedure as in Example 1, 18 g of a Mg—Al—Mn composite oxide catalyst (Mg:Al:Mn (by atomic ratio)=0.56:0.22:0.22) was obtained.

EXAMPLE 5

To prepare a solution A, 57.26 g (0.223 mol) of magnesium nitrate hexahydrate, 50.06 g (0.133 mol) of aluminum nitrate nonahydrate, and 35.60 g (0.089 mol) of chromium nitrate nonahydrate were dissolved in 450 g of deionized water. On the other hand, 23.57 g (0.222 mol) of sodium carbonate was dissolved in 450 g of deionized water to prepare a solution B.

After that, according to the same procedure as in Example 1, 23 g of a Mg—Al—Cr composite oxide catalyst (Mg:Al:Cr (by atomic ratio)=0.50:0.30:0.20) was obtained.

EXAMPLE 6

To prepare a solution A, 68.03 g (0.265 mol) of magnesium nitrate hexahydrate, 47.69 g (0.127 mol) of aluminum nitrate nonahydrate, and 21.35 g (0.085 mol) of ferrous chloride tetrahydrate were dissolved in 450 g of deionized water. On the other hand, 13.47 g (0.127 mol) of sodium carbonate was dissolved in 450 g of deionized water to prepare a solution B.

After that, according to the same procedure as in Example 1, 18 g of a Mg—Al—Fe composite oxide catalyst (Mg:Al:Fe (by atomic ratio)=0.56:0.26:0.18) was obtained.

EXAMPLE 7

Following the same procedure as in Example 1 except that 16.82 g (0.085 mol) of manganese chloride tetrahydrate was used as the manganese salt, 19 g of a Mg—Al—Mn composite oxide catalyst (Mg:Al:Mn (by atomic ratio)=0.56:0.26:0.18) was obtained.

EXAMPLE 8

Following the same procedure as in Example 1 except that 20.49 g (0.085 mol) of manganese sulfate pentahydrate was used as the manganese salt, 19 g of a Mg—Al—Mn composite oxide catalyst (Mg:Al:Mn (by atomic ratio)=0.56:0.26:0.18) was obtained.

EXAMPLE 9

Following the same procedure as in Example 1 except that 9.77 g (0.085 mol) of manganese carbonate was used as the manganese salt, 19 g of a Mg—Al—Mn composite oxide catalyst (Mg:Al:Mn (by atomic ratio)=0.56:0.26:0.18) was obtained.

EXAMPLE 10

To prepare a solution A, 317.48 g (1.24 mol) of magnesium nitrate hexahydrate, 222.55 g (0.593 mol) of aluminum nitrate nonahydrate, and 96.9 g (0.396 mol) of manganese acetate tetrahydrate were dissolved in 600 g of deionized water. On the other hand, 62.88 g (0.593 mol) of sodium carbonate was dissolved in 500 g of deionized water to prepare a solution B.

The solutions A and B were dropped into a catalyst preparation vessel previously supplied with 480 g of deionized water over a period of 1 hour, while maintaining the pH of 9 with 10N-NaOH and the temperature of 70° C. After completing the dropping step, the mixture solution was aged for 1 hour. The mother liquor was removed by filtration, and the precipitate was washed with 9.6 liters of deionized water and spray-dried, and 92 g of a composite hydroxide was obtained. The composite hydroxide was calcined for 3 hours at 800° C. in a nitrogen atmosphere to obtain 60 g of a Mg—Al—Mn composite oxide catalyst (Mg:Al:Mn (by atomic ratio)=0.56:0.26:0.18).

COMPARATIVE EXAMPLE 1

To prepare a solution A, 57.26 g (0.223 mol) of magnesium nitrate hexahydrate and 66.80 g (0.178 mol) of aluminum nitrate nonahydrate were dissolved in 450 g of deionized water. On the other hand, 18.87 g (0.178 mol) of sodium carbonate was dissolved in 450 g of deionized water to prepare a solution B.

After that, following the same procedure as in Example 1, 17 g of a Mg—Al composite oxide catalyst (Mg:Al (by atomic ratio)=0.556:0.444) was obtained.

COMPARATIVE EXAMPLE 2

25 g of aluminum magnesium hydroxide with a chemical composition of $2.5MgO \cdot Al_2O_3 \cdot mH_2O$ (KYOWAAD (registered trademark) 300 manufactured by Kyowa Chemical Industry) was calcined in a nitrogen atmosphere at 800° C. for 3 hours, and 16 g of Mg—Al composite oxide catalyst was obtained.

COMPARATIVE EXAMPLE 3

25 g of hydrotalcite with a chemical composition of $Mg_6Al_2(OH)_{16}CO_3 \cdot 4H_2O$ (KYOWAAD (registered trademark) 500 manufactured by Kyowa Chemical Industry) was calcined in a nitrogen atmosphere at 500° C. for 3 hours, and 18 g of Mg—Al composite oxide catalyst was obtained.

Using each catalyst obtained in Examples 1 to 10 and Comparative Examples 1 to 3, alkylene oxide addition reactions were carried out according to the reaction evaluation method I as described below. The reactions are referred to as Reaction Examples 1 to 10 and Comparative Reaction Example 1 to 3, respectively. Furthermore, the catalytic activity and the amount of high molecular weight polyethylene glycol (PEG) formed as a by-product in each reaction example were evaluated according to the respective methods as described below. The evaluation results are shown in Table 1.

Furthermore, using each catalyst obtained in Example 1 and Comparative Example 1, alkylene oxide addition reactions were carried out according to the reaction evaluation method II as described below. The reactions are referred to as Reaction Example 11 and Comparative Reaction Example 4, respectively. The evaluation results of the reactions are shown in Table 2.

REACTION EVALUATION METHOD I 400 g of lauryl alcohol and 0.4 g of a catalyst were put in a 4-liter capacity autoclave. The air in the autoclave was replaced with nitrogen gas, and the temperature was increased while stirring. Then, while maintaining the temperature of 180° C. and the pressure of 3 atm, 663 g of ethylene oxide (EO) (average adduct molar number: 7) was introduced to cause reaction between the lauryl alcohol and the EO.

REACTION EVALUATION METHOD II 400 g of methyl laurate, 1.2 g of catalyst, and 0.12 g of 40% KOH aqueous solution were put in a 4 liter capacity autoclave. The air in the autoclave was replaced with nitrogen gas, and the temperature was increased while stirring. Then, while maintaining the temperature of 180° C. and the pressure of 3 atm, 494 g of EO (average adduct molar number: 6) was introduced to cause reaction between the methyl laurate and the EO.

CATALYTIC ACTIVITY

In each of the above-mentioned reaction evaluation methods, the EO supplying rate (g-EO/min) was converted into a value per unit amount of catalyst after a point when the temperature and the pressure reached the predetermined values (180° C. and 3 atm, respectively). The obtained value was used as an evaluation measure of the catalytic activity (the unit: [g-EO/(min·g-catalyst)]). The EO supplying rate corresponds to the amount of EO consumed per unit time under the above-mentioned predetermined temperature and pressure conditions. During this measurement, the catalyst concentration was adjusted to a low level so that catalytic activity under the control of chemical reaction rate can be evaluated accurately.

THE AMOUNT OF HIGH MOLECULAR WEIGHT PEG FORMED AS BY-PRODUCT

In each of the above reaction evaluation methods, the content of high molecular weight polyethylene glycol having a molecular weight of at least 20,000 in the reaction product was analyzed quantitatively according to the HPLC method, and the comparison was made based on weight %.

TABLE 1

Reaction Examples 1 to 10 and Comparative Reaction Examples 1 to 3.

| | | Composite Oxide Catalyst | Catalytic Activity (g – EO/ (min . g – cat)) | Amount of High Molecular Weight PEG Formed as By-product (wt. %) |
|---|---|---|---|---|
| Reaction | | | | |
| Example | 1 | Catalyst of Ex. 1 | 6.0 | 0.06 |
| | 2 | Catalyst of Ex. 2 | 11.1 | 0.04 |
| | 3 | Catalyst of Ex. 3 | 8.6 | 0.09 |
| | 4 | Catalyst of Ex. 4 | 3.4 | 0.05 |
| | 5 | Catalyst of Ex. 5 | 3.6 | 0.16 |
| | 6 | Catalyst of Ex. 6 | 3.0 | 0.20 |
| | 7 | Catalyst of Ex. 7 | 6.1 | 0.05 |
| | 8 | Catalyst of Ex. 8 | 4.5 | 0.02 |
| | 9 | Catalyst of Ex. 9 | 4.7 | 0.05 |
| | 10 | Catalyst of Ex. 10 | 9.2 | 0.04 |
| Comparative Reaction | | | | |
| Example | 1 | Catalyst of Comp. Ex. 1 | 5.7 | 0.53 |
| | 2 | Catalyst of Comp. Ex. 2 | 4.8 | 0.60 |
| | 3 | Catalyst of Comp. Ex. 3 | 6.7 | 1.10 |

TABLE 2

Reaction Example 11 and Comparative Reaction Example 4.

| | Composite Oxide Catalyst | Catalytic Activity (g – EO/ (min . g – cat)) | Amount of High Molecular Weight PEG Formed as By-product (wt. %) |
|---|---|---|---|
| Reaction | | | |
| Example 11 | Catalyst of Ex. 1 | 2.7 | 0.06 |
| Comparative Reaction Example 4 | Catalyst of Comp. Ex. 1 | 1.9 | 0.58 |

As is apparent from the results in Tables 1 and 2, formation of high molecular weight polyethylene glycol as a by-product is inhibited when using the catalyst of the present invention. Particularly, when using the catalyst of Example 1 containing Mn, the amount of high molecular weight polyethylene glycol formed as a by-product is decreased to about one tenth the amount of that formed with the catalyst of Comparative Example 1, which was prepared according to the same procedure but not containing Mn.

Furthermore, it was confirmed that the ability of catalyst is influenced depending on the type of the starting manganese salt. For example, the acetate is preferable with respect to catalytic activity, and the sulfate is preferable for inhibiting formation of high molecular weight polyethylene glycol as a by-product.

In a multi-layered hydroxide as a catalyst precursor before being calcined, anions are believed to be taken in the guest layer having a layered structure (while the host layer is metal hydroxide). As a result, the anions influence the crystal structure of the catalyst precursor.

Figure 12:
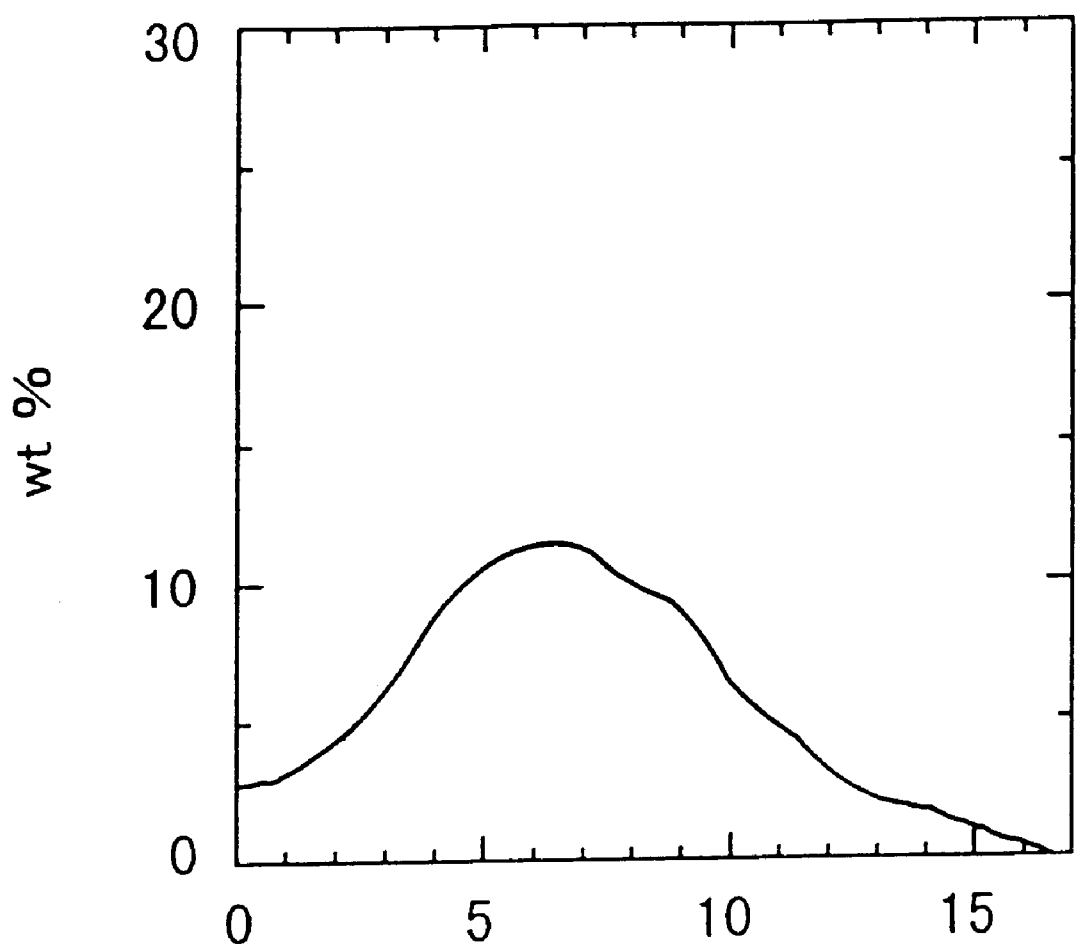
FIG. 12 is a graph showing the adduct distribution of an EO adduct obtained according to a reaction example using a KOH catalyst.

With respect to the EO adducts obtained in Reaction Examples 1 to 6 and 11 and Comparative Reaction Examples 1 to 4, EO adduct distribution was measured by the HPLC method. The results are shown in FIGS. 1 to 11. Furthermore, for the purpose of comparing the adduct distribution, alkylene oxide addition reaction was carried out using a KOH catalyst as an alkali catalyst according to the above-mentioned reaction evaluation method I. The adduct distribution of the EO adduct obtained by this reaction was measured in the same way as mentioned above. The result is shown in FIG. 12.

Figure 13:
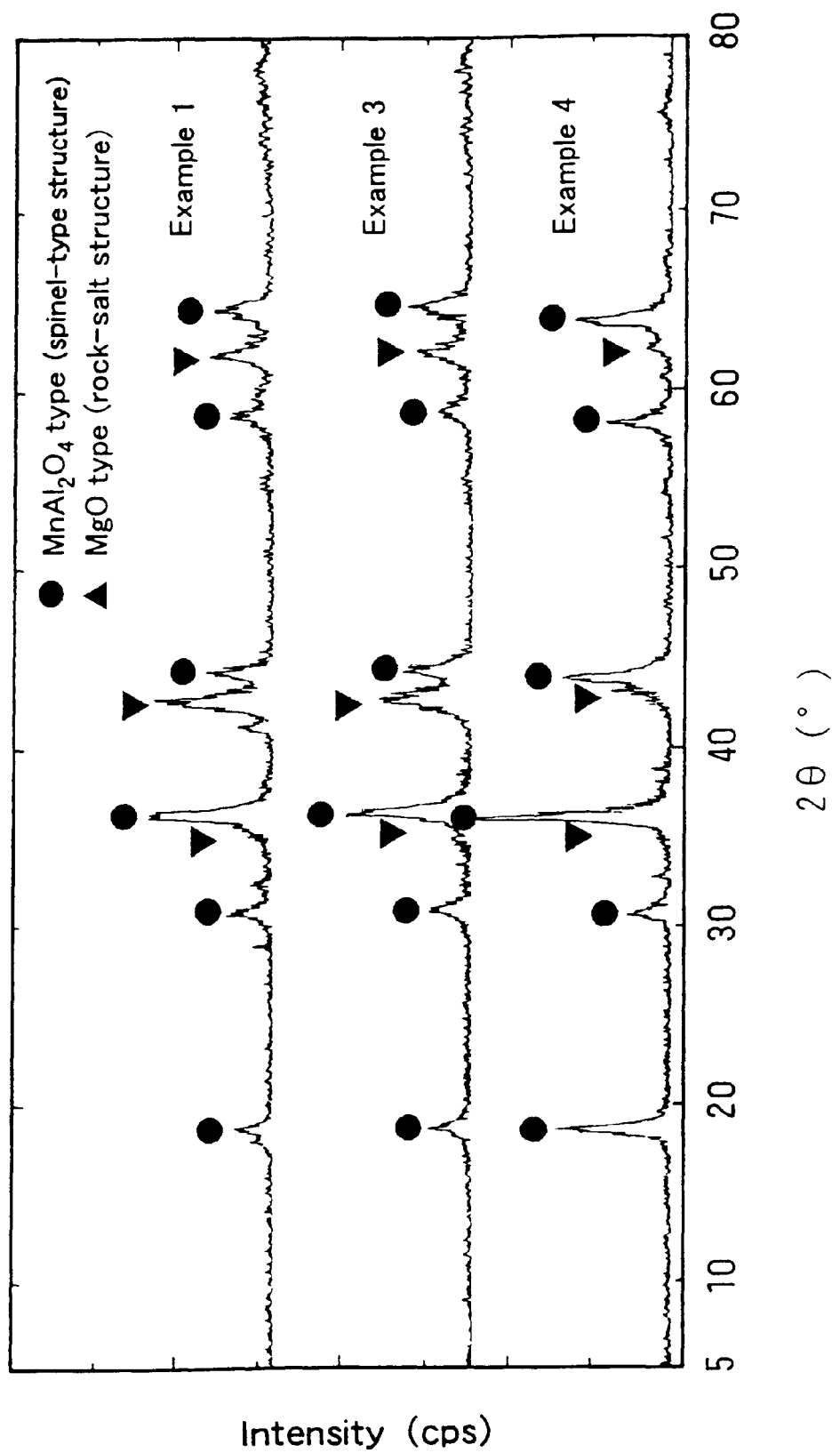
FIG. 13 shows X-ray diffraction patterns of catalysts obtained in Examples 1, 3 and 4.
Figure 14:
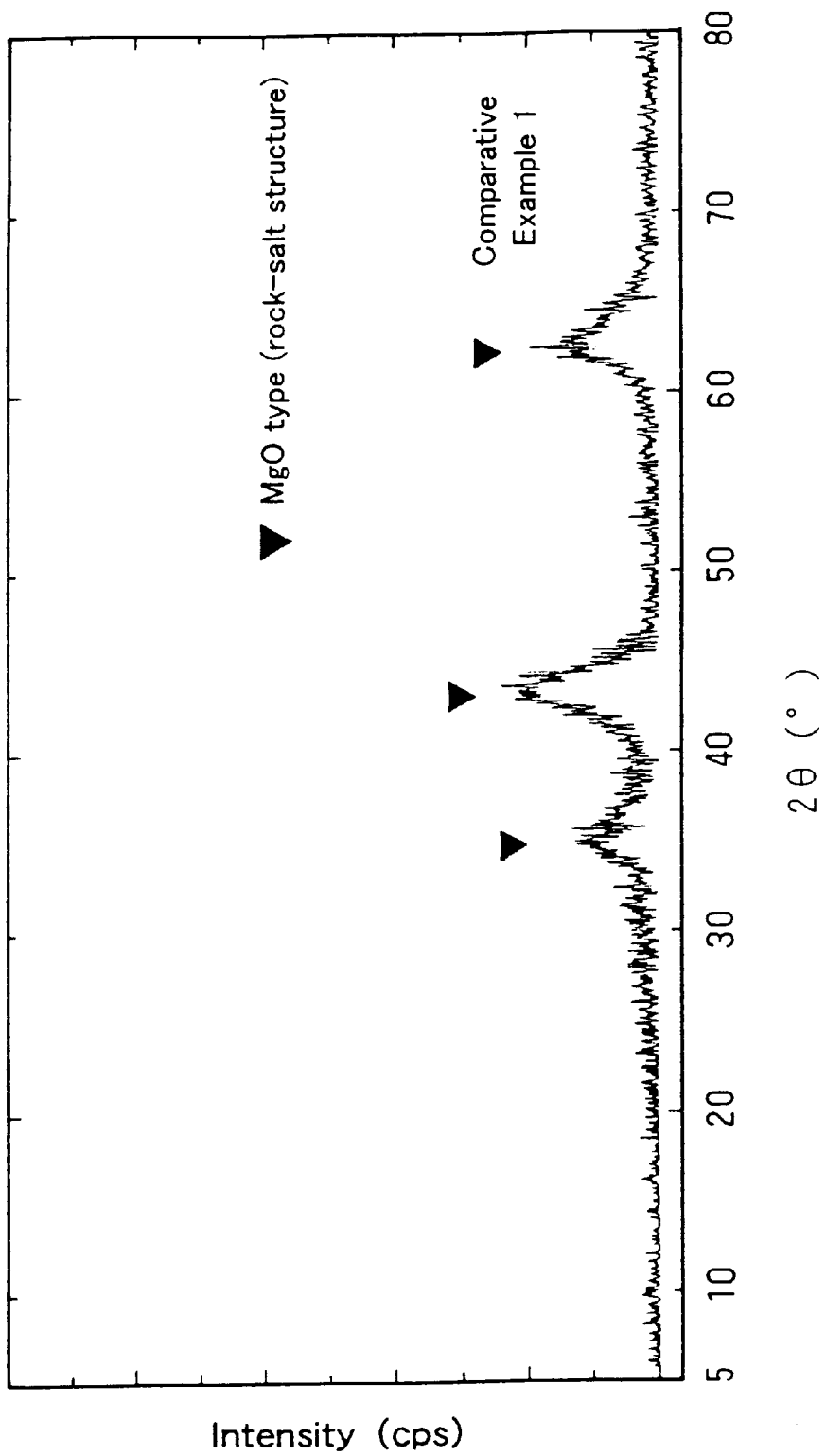
FIG. 14 shows an X-ray diffraction pattern of a conventional catalyst obtained in Comparative Example 1.

Furthermore, crystal structure was investigated for each of the catalysts obtained in Examples 1, 3 and 4, and Comparative Example 1 by X-ray diffraction. The results are shown in FIGS. 13 and 14. As shown in FIG. 13, in each of the Examples, formation of a spinel-type oxide comprising aluminum and manganese ($MnAl_2O_4$) was confirmed. Furthermore, a peak resulting from an oxide with a rock-salt structure (MgO) was confirmed as well as a peak resulting from a spinel-type structure. On the other hand, as shown in FIG. 14, only a peak resulting from a rock-salt structure of magnesium oxide was observed in the Comparative Example.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A method for producing an alkylene oxide adduct, which comprises adding an alkylene oxide to an organic compound in the presence of an alkoxylation catalyst comprising a metal oxide containing magnesium, aluminum, and at least one metal selected from the metals that belong to group VIA, group VIIA and group VIII.

2. The method according to claim 1, wherein the metals that belong to group VIA, group VIIA, and group VIII are chromium, molybdenum, manganese, technetium, iron, cobalt, nickel, and ruthenium.

3. The method according to claim 1, wherein the metals that belong to group VIA group VIIA, and group VIII are chromium, manganese, and iron.

4. The method according to claim 1, wherein the atomic ratio between magnesium and aluminum as shown by Al/(Mg+Al) is in the range of 0.1 to 0.7.

5. The method according to claim 1, wherein the atomic ratio between magnesium and aluminum as shown by Al/(Mg+Al) is in the range of 0.3 to 0.6.

6. The method according to claim 1, wherein the atomic ratio of the metal selected from the metals that belong to group VIA, group VIIA, and group VIII with respect to the total of magnesium, aluminum, and the metals is in the range of 0.05 to 0.4.

7. The method according to claim 1, wherein the metal oxide is obtained from a precipitate from a solution including an aluminum compound, a magnesium compound, and a compound of the metal selected from the metals that belong to group VIA, group VIIA, and group VIII as solutes.

8. The method according to claim 7, wherein the compound of the metal is at least one selected from a nitrate, an acetate, a sulfate, a chloride, and a carbonate.

9. The method according to claim 1, wherein the metal oxide includes a spinel-type structure that contains aluminum and the metal selected from the metals belonging to group VIA, group VIIA, and group VIII.

\* \* \* \* \*